United States Patent Office 3,209,594
Patented Oct. 5, 1965

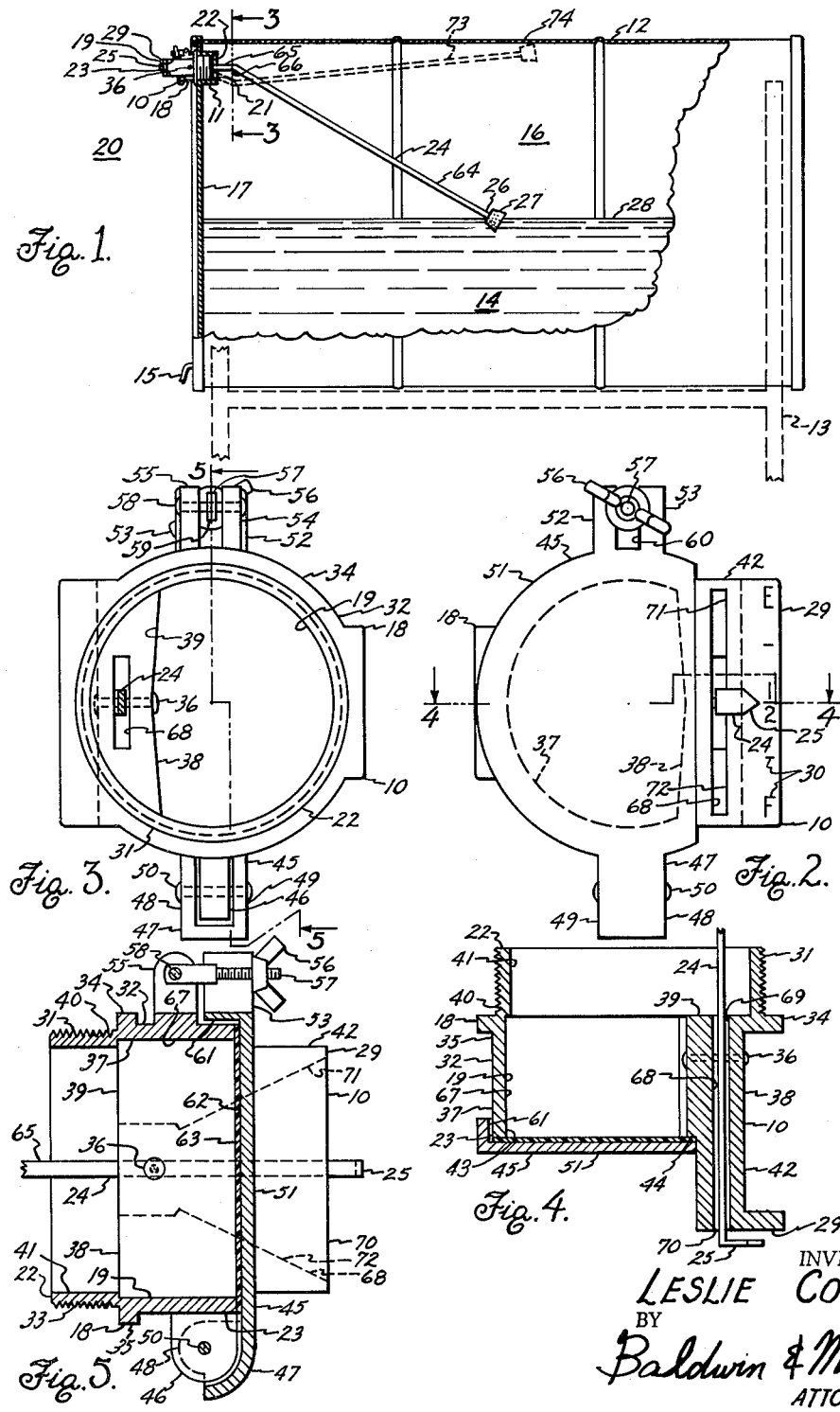

3,209,594
LIQUID LEVEL GAUGE AND CONDUIT
Leslie Counts, 1940 University Blvd., Jacksonville, Fla.
Filed June 6, 1962, Ser. No. 200,404
4 Claims. (Cl. 73—306)

This invention relates to liquid level gauges or indicators, and more particularly to liquid level gauges or indicators of the kind which have a float that is adapted to ride on the surface of the liquid in a liquid holding vessel, such as a tank or drum for holding household heating fuel oils. Gauges constructed in accord with the invention described herein are characterized by having a passageway for use in the admission of a liquid to the vessels to which they may be secured, and are particularly adapted for mounting in the threaded horizontally extending passageways at the ends or sides of vessels as opposed to being adapted for mounting in a vertically extending passageway in such vessels.

House heating is widely accomplished by the firing of liquid fuel oils. In the southern part of the United States, and particularly in areas where the water table is high and which thus more or less precludes below ground storage, the fuels are stored above ground in suitable vessels such as tanks or drums. Many of these vessels are especially fabricated for their intended use and are thus provided with vertically extending passageways at their upper extremity for use in admitting the fuel oil to the vessel. Float type gauges which may be mounted in such passageways and which perform the dual function of indicating the amount of fuel in the vessel and of serving as a conduit for the admission of fuel to the vessel are known. Such gauges, however, are not suitable for use with vessels when the passageways for admission of the liquid fuels extend generally horizontally. Although many of the vessels used on fuel for storage have vertically extending passageways still others have only the horizontally extending passageways referred to. For example, the well-known fifty-five gallon drums are commonly employed for storing household fuels, primarily because they can be mass-produced for many different uses and consequently are inexpensive to the homeowner. Such drums are cylindrical and are usually provided with an opening in the end wall of the drum rather than in the cylindrical wall for use in filling the drum. When such drums are used for household type fuel oil storage they are usually supported with the axis of the drum horizontal and thus with the passageway in the end wall extending horizontally.

A particular problem which is involved in designing a float type gauge for use with vessels having horizontally extending pasageways is associated with the location of such passageways. Quite obviously if the vessel has a passageway which extends horizontally, and which is used in admitting liquids to the vessel, it is located near the upper extremity of the vessel and thus closely adjacent the upper wall portion of the vessel, for otherwise the full capacity of the vessel could not be utilized. Heretofore float type gauges which serve the aforementioned dual function have not been of suitable design for mounting in such horizontal passageways, or have otherwise been of such complicated design as to make their manufacturing costs impractical for ultimate consumer sale and use. The chief cause of these inadequacies is tied to the fact that most of such passageways are internally threaded to normally accommodate a threaded bung or closure, and consequently for practical reasons gauges for such uses should also be provided with a threaded portion so as to facilitate the easy mounting of the gauge in the passageway. However, use of a threaded means for securing the gauge in the horizontal passageway requires rotation of the gauge as it is being mounted in the drum or tank and consequently if the liquid level sensing and indicating assembly of the gauge or indicator has elements which are adapted to assume a position that is laterally offset from the passageway in the tank, as must be the case in order to sense the level of liquid when the tank is less than full, such elements engage the upper wall portion of the vessel and interfere with the procedure for mounting the threaded gauge in the horizontal passageway.

A general object of the invention is to provide a liquid level gauge or indicator which serves as a conduit for the admission of liquids to a liquid holding vessel and which is adapted for mounting in the end or side wall passageway of the vessel.

Another object of the invention is to provide a gauge for indicating the liquid level in drums, tanks and the like vessels and which is so constructed as to be permanently installable in a threaded horizontally extending passageway of the vessel and yet adapted to permit the filling of the tanks by the passage of liquid through the opening in the passageway employed for the installation of the gauge.

Another object of the invention is to provide a float type liquid level indicator for tanks and the like which is inexpensive to manufacture, being simple in construction, which is installable in the opening of a tank, the liquid level of which is to be indicated thereby, and which permits the passage of liquid through the opening in which the indicator is installed without the removal of the indicator from the tank.

Another object of the invention is to provide a float type liquid level indicator which is installable in the end or side wall opening of a tank that is adjacent to another wall of the tank, such as the cylindrical wall of the conventional 55 gallon drum, which is permanently installable in the opening and which may be inserted and mounted in the opening without appreciable interference with the side wall of the drum, the gauge, in addition, being adapted to function as a conduit so that liquid may be admitted to the drum through the opening employed for mounting the gauge.

Still another object of the invention is to provide a gauge which is mountable in a passageway in the side wall of a tank or drum and which is so constructed as to still enable the use of the opening in the passageway for admission of the liquid to the tank, and which is so designed as to prevent the admission of rain water and the like through the opening.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

FIGURE 1 is a side elevational view of a conventional 55 gallon drum as supported for use in the home storage of fuel oils, certain parts being broken away to show an embodiment of the invention as mounted in the end wall of the drum.

FIGURE 2 is an enlarged end view of the gauge shown in FIGURE 1 and as seen from the exterior of the drum.

FIGURE 3 is an enlarged end view of the gauge shown in FIGURE 1 as seen from the interior of the drum, the view being partly in section along the lines 3—3 of FIGURE 1.

FIGURE 4 is a sectional view of the gauge taken along the lines 4—4 of FIGURE 2 with certain components thereof being broken away.

FIGURE 5 is a vertical sectional view taken along the lines 5—5 of FIGURE 3.

With particular reference to the drawing the gauge embodying the inventive concepts is designated at 10, and is shown mounted in the opening of the end wall passageway 11 of drum 12. Drum 12 is a conventional 55 gallon drum such as is commonly employed for storing house heating fuel. It is generally cylindrical in shape and is supported, as shown in FIGURE 1, with its axis horizontal, on a framework 13 which is generally illustrated by means of broken lines in FIGURE 1. As shown in FIGURE 1, the drum contains fuel oil 14, and a suitable conduit 15 which communicates with the interior 16 of the drum at its lower extremities is provided to convey the fuel oil to a suitable burner, not shown. Passageway forming member 11 is an integral part of the end or side wall 17 of the drum and is provided with interior threads so that the gauge may be screwed into the opening thereof.

Gauge 10 includes a body portion 18 which forms a passageway 19 that communicates with the interior 16 and the exterior 20 of the drum at its opposite ends 22 and 23, as when the gauge is mounted in the opening 21 of the end wall passageway 11 of drum 12. Gauge 10 also includes an elongated resilient arm-like member 24 which is pivotally secured between its opposite ends 25 and 26 to the body portion 18 of the gauge by means of a pivot pin 36. Gauge 10 also has a float 27, such as a cork commonly employed as a bottle stop, which is suitably secured to the interior end 26 of the arm. The rise and fall of the level of the fuel oil 14 in drum 12 is sensed by the buoyant float 27 and as it is displaced from the position shown in FIGURE 1, either upwardly or downwardly, by a rise or fall in the liquid level 28, arm 24 is caused to pivot about the horizontal axis of pin 36. This pivotal movement of arm 24 causes a vertical displacement of the exterior pointed end 25 of the arm relative to the outer face portion of the body, indicated at 29. Face 29 is provided with indicia 30, as seen in FIGURE 2, which is indexed by the pointed end 25 of the arm 24 in accord with its displacement and which accordingly when read in conjunction with the position of pointer 25 indicates the degree of fullness of the tank.

The passageway forming portion 19 of the body member 18 includes a hollow cylindrical portion 31 at the inner end 22 of the passageway, as seen in FIGURE 5, and another hollow portion 32 at the outer end 23 of the passageway. Cylindrical portion 31 is provided with exterior threads, indicated at 33 which are adapted to cooperate with the interior threaded portion of the drum passageway 11 so as to facilitate the secure mounting of the gauge 10 in the opening of the end wall passageway 11. Hollow portion 32 is a segmented cylindrical member which is integrally formed with portion 31, and is so arranged with respect to portion 31 in the embodiment as to be disposed coaxially therewith so that the hollows of the respective portions communicate for the passage of fuel oil into tank 12. Hollow portion 32 is provided with a radially extending flange portion 34 at its inner end 35 which functions as a stop that engages the outer end of passageway 11 when the body 18 is being screwed into the opening thereof and thus limits the extent to which the body portion can be screwed into the passageway 11.

In addition to being provided with an arcuate wall portion 37, hollow portion 32 is provided with a chordal wall portion 38 which forms a part of the passageway extending through body member 18. As best seen in FIGURES 3 and 5, this chordal wall portion 38 has an end face 39 at the inner end 35 of the segmented member 32 and which confronts the hollow 41 in cylindrical member 31 at the inner end 40 of the latter. The body of the gauge also has a forwardly projecting portion indicated at 42 which is integrally formed with hollow member 32 and projects forwardly of and at the side of the exterior opening 43 from the outer end face 44 of chordal wall portion 38, and which in a sense forms an integrally formed exterior extension thereof.

Gauge 10 is provided with a cap or closure indicated at 45 and which includes a generally flat segmented circular disc-like body portion 51 which is pivotally secured to the body portion 18 of the gauge 10 and adapted to close the outer end of passageway 19. As seen in FIGURES 3 and 5, the segmented cylindrical portion 32 of the body member 18 is provided with a radially extending tab 46 adjacent the outer end of passageway 19. Tab 46 is an integral part of member 32 and when the gauge 10 is suitably secured to the drum 10 is located at the bottom of the gauge body portion. Cap 45 has a portion, indicated at 47, which extends radially of the disc 51 and which is provided with inwardly projecting flat and spaced side elements 48 and 49 that lap the opposite sides of tab 46. The cap is pivotally secured to body member 18 by means of headed pivot pin 50 which extends through these side elements as well as through the interposed tab element 46.

Cap 45 also has a pair of spaced ears 52 and 53 which are located at the opposite side of disc 51 as compared to member 47 and which extend generally radially of the body portion 51 as seen in FIGURES 2, 3 and 5. Body member 18 is provided with another pair of spaced generally radially extending ears designated at 54 and 55 which are integral parts of bottom member 32. These ears are generally aligned with ears 52 and 53 when the cap is in the closed position shown in the drawings. Cap 45 is releasably secured in the closed position by means of a wing nut 56 carrying elongated threaded element designated at 57 which is pivotally secured to the body member 18 by means of a pivot pin 58 which passes through elements 56 and 57 and the end 59 of element 57 interposed therebetween. Element 57 is adapted to pivot about the axis of pin 58 into and out of the slot 60 between ears 52 and 53, and the cap is secured in the closed position by tightening down on the winding nut 56 when the element 57 is disposed in slot 60. Cap 45 is also provided with a flange 61 which projects rearwards generally along the arcuate edge portion of the segmented disc like body portion 51 which aids in shielding the end of the passageway 19 from rain and the like. The inner face 62 of the body 51 of the cap is covered by gasket material 63 as seen in FIGURES 4 and 5 and aids in sealing the passageway when the cap is in the closed position.

As seen in FIGURE 3, arm element 24 is generally rectangular in shape when viewed in cross section and has a narrower horizontal dimension than vertical dimension. As seen in FIGURE 1 this element 24 is bent downwardly in the direction of the vertical dimension adjacent the body portion 18 of the gauge 10 so that it has a generally longer segment designated at 64 and a relatively shorter segment which is designated at 65 in the opposite direction from the bend. At the bend 66 these segments define an oblique angle of less than 180° and the element 24 is thus bent so as to sense the movements of the float throughout the tank as the level of liquid changes generally below the horizontal axis of the gauge passageway 19.

To enable the pointer arm 24 to pass through the body portion 18 in a manner such that it will not be broken by the insertion of a hose nozzle into the exterior end of the passageway, as when the tank is being filled, the body portion 18 is provided with a narrow horizontal slot or aperture indicated at 68 which is of sufficient vertical dimension to accommodate the pivotal movement of the arm portion within the slot. Slot 68 has an axis which is generally horizontal as seen in FIGURE 5 and passes through and generally in parallel with the chordal wall portion 38 and extension 42 as seen in FIGURES 3, 5 and 4, opens at its rear end 69 through face 39 of the chordal wall portion and into the hollow 67 of cylindrical portion 31. On the other hand the other or front end 70 of the aperture 68 opens through the front face 29 of extension 42. As seen in FIGURE 5 the short section 65 of arm 24 extends through the opening at the interior end 22 of the passageway and thence passes through the slot 67 to the pointed end 25 thereof. Pivot pin 36 extends transversely of the slot so that the axis for pivotal movement of arm 24 extends horizontally through the slot. As best seen in FIGURE 5, the upper 71 and lower 72 walls of the slot flare outwardly from the general axis of the slot in front of the pivot axis for arm 24 so as to accommodate the pivotal movement of the arm and thus to enable a full sweep of the pointed end 25 of the arm in front of the indicia 30. Lower wall 72 has a downwardly and outwardly extending surface which deflects any rain water entering the front end of the aperture back toward the exterior opening thereof.

When the gauge 10 is being mounted in a tank or drum, such as drum 12, the long sector 64 of the arm is first passed through the opening in the passageway 11 of the wall 17 until the threaded end of the body contacts the threaded portion of the passageway. Thereafter the gauge 10 is rotated to screw the body portion into the opening, and as this transpires and the body of the gauge is inverted from the position shown in the drawings, the arm 24 assumes the dotted line position shown in FIGURE 1 at 73. Walls 72 and 71 of the slot 68 also function as stops which limit the pivotal movement of the arm. Consequently when the gauge is inverted the portion of the arm in front of pivot 36 will engage wall 72 and limit further displacement of the long sector 64 in a downward direction from that shown by the dotted line position at 73. However, bend 66 and the length of the elongated sector 64 are so arranged and adapted that the float 27 assumes a position closely adjacent the axis of the passageway 19 when the gauge is inverted and further pivotal movement of the arm is limited by engagement of the short sector 65 with wall 72 so that interference with the upper portion of the cylindrical wall as at 74 is avoided. In the event the float 27 does scrape the wall, as at 74, as the gauge is screwed into the end wall 17, arm 24 is of sufficient flexibility by reasons of the narrow cross sectional dimension thereof to enable the arm to twist slightly without becoming permanently deformed, until the body is sufficiently rotated to permit disengagement between the float and wall. When the body 18 of the gauge has been screwed into the opening the gauge assumes the position shown in solid lines in the drawing. As such, when float 27 falls with the level of the liquid from its position shown in FIGURE 1, arm 24 pivots on pin 36 and the pointed end 25 of the arm 24 and which end is shown bent at a 90° angle in front of the front face of extension 29 in the drawing (see FIGURES 2, 3 and 4) moves upwardly along the indicial bearing face 29 and vice versa when the float rises when the tank is being filled.

The tank 12 is filled by releasing the cap through obvious manipulation of the wing nut 56 and pivotal movement of threaded element 57 out of slot 60. This enables the cap 45 to pivot on pin 50 to expose the opening in the passageway through which fuel oil may be inserted and conveyed to the interior 16 of the drum.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A liquid level gauge and tank filling device adapted for mounting in the side wall of a liquid holding tank comprising a body portion having a horizontal tank filling passageway extending therethrough for the passage of liquid into the tank, a closure device pivotally secured to said body portion and adapted for pivotal movement to a closed position at one end of said passageway, said body portion having an externally threaded portion at the other end of said passageway for use in securing said body portion in a threaded opening in the side wall of the tank, a float disposed remotely from the other end of said passageway for sensing the liquid level in the tank, elongated means attached at one of its ends to said float and extending from said float into said other end of said passageway, said elongated means extending through an opening in said body member and terminating in another end disposed exteriorly of said body member forwardly of said one end of said passageway and of said closure device, and means pivotally securing said elongated means to said body portion between its said ends internally within said opening and establishing a pivot axis for limited pivotal movement of said elongated means thereabout, said body portion further having an indicia carrying member extending forwardly of the said one end of said passageway and of said closure device, said indicia being disposed adjacent said other end of said elongated means and being indexed above and below said pivot axis and in accord with the pivotal movement of said other end of said elongated means thereby to indicate the liquid level sensed by said float.

2. A liquid level gauge and tank filling device adapted for mounting in the side wall of a liquid holding tank comprising a body portion having a passageway extending therethrough for the admission of liquid to the tank, said body portion including an externally threaded hollow cylindrical first portion and a hollow cylindrical second portion which is axially aligned and integrally formed with said first portion, said second portion including a thick wall portion having a face at its inner end which confronts the inner end of the hollow in said first portion, a closure member pivotally secured to said second portion for closing the open outer end of the hollow therein, said body portion further including an extension integrally formed with and projecting outwardly of the outer end face of said wall portion and further having an elongated aperture of narrow horizontal width dimension which passes through said wall portion from its inner end through its outer end and through said extension thereof, one end of said aperture opening inwardly at said inner end face of said wall portion and at the other end of said aperture opening outwardly at the outer face of said extension, a float disposed remotely from said first portion for sensing the liquid level in the tank, an elongated element extending through the hollow in said first portion and outwardly through said aperture in said wall portion and said extension thereof, one end of said element being secured to said float and the other end being disposed outwardly of said extension for indicating the liquid level sensed by said float, pivot means connecting said element between its ends to said second portion for limited pivotal movement about a horizontal axis disposed between said aperture ends, and said extension having indicia adjacent said other end of said element and being indexed in accord with the pivotal movement of said other end of said element, thereby to indicate the liquid level sensed by said float.

3. A liquid level gauge and tank filling device adapted for mounting in the side wall of a liquid holding tank in accord with claim 2 wherein said second portion further includes surface means partially defining said aperture for deflecting water entering said other end of said aperture at said outer face of said extension back toward and out said other aperture end.

4. A liquid level gauge and tank filling device adapted for mounting in the side wall of a liquid holding tank in accord with claim 2 wherein said elongated element is bent between its said one end and said pivot means adjacent said body member to form an oblique angle at the bend of less than 180°, the indicia on said extension extending above and below said horizontal axis, said other end of said element indicating on the indicia above said horizontal axis when the tank contains less than one-half of its liquid capacity and indicating below said horizontal axis when the tank contains more than one-half of its liquid capacity, said body portion further including means cooperating with said element for stopping pivotal movement of said element about said pivot axis in the direction of said bend when said float secured thereto is in a pivot position substantially corresponding to the axis of said passageway of said body portion.

References Cited by the Examiner
UNITED STATES PATENTS

| | | | |
|---|---|---|---|
| 1,463,342 | 7/23 | Stanley | 73—306 |
| 1,514,565 | 11/24 | Nilson et al. | 73—306 |
| 2,309,497 | 1/43 | Caddell | 73—317 |
| 2,718,785 | 9/55 | Spencer | 73—317 |
| 2,920,601 | 1/60 | Turner | 73—317 |
| 2,979,949 | 4/61 | Counts | 73—317 |

ISAAC LISANN, *Primary Examiner.*

ROBERT B. HULL, ROBERT L. EVANS, *Examiners.*